United States Patent [19]

Nagaoka

[11] Patent Number: 5,191,443
[45] Date of Patent: Mar. 2, 1993

[54] IMAGE PROCESSOR
[75] Inventor: Daiji Nagaoka, Kanagawa, Japan
[73] Assignee: Fuji Xerox Co., Ltd., Tokyo, Japan
[21] Appl. No.: 854,790
[22] Filed: Mar. 23, 1992

Related U.S. Application Data
[63] Continuation of Ser. No. 293,281, Jan. 4, 1989.

[30] Foreign Application Priority Data
Jan. 6, 1988 [JP] Japan .................................. 63-1546

[51] Int. Cl.$^5$ ............................................. H04N 1/387
[52] U.S. Cl. .................................... 358/453; 358/444; 358/452
[58] Field of Search ............... 358/400, 401, 404, 443, 358/444, 448, 452, 453

[56] References Cited

U.S. PATENT DOCUMENTS

| | | | |
|---|---|---|---|
| 4,617,596 | 10/1986 | Yoshida et al. | 358/452 |
| 4,750,044 | 6/1988 | Nakajima | 358/280 |
| 4,896,208 | 1/1990 | Moriya et al. | 358/452 |

FOREIGN PATENT DOCUMENTS

| | | |
|---|---|---|
| 089174 | 9/1983 | European Pat. Off. |
| 60-213168 | 10/1985 | Japan . |
| 60-242480 | 12/1985 | Japan . |
| 2119198 | 11/1983 | United Kingdom . |

Primary Examiner—Edward L. Coles, Sr.
Assistant Examiner—Thomas D. Lee
Attorney, Agent, or Firm—Finnegan, Henderson, Farabow, Garrett and Dunner

[57] ABSTRACT

An image processor for performing image processing operations on one or more designated areas of an original. Three bit maps are used to store the processing operations, with each bit map storing one bit of the code for each region. Thus, one of $2^3$ processing operations can be stored for each portion of a designated region. As the original is read in, corresponding bits of the three bit maps are read out. These three bits address a table containing a function code identifying the processing operation to be performed on the corresponding portion of the original.

10 Claims, 3 Drawing Sheets

IMAGE PROCESSOR

This application is a continuation of application Ser. No. 07/293,281, filed Jan. 4, 1989.

BACKGROUND OF THE INVENTION

Field of Industrial Application

The present invention relates to an image processor for carrying out various image processing operations by reading image information and, in particular, to an image processor for performing image processing for a designated region of an image different from the processing performed for other regions of the image.

DESCRIPTION OF THE PRIOR ART

Generally, in an image processor, the image of an original is read by an image input device and converted to an electrical image signal. After undergoing various kinds of image processings, the image signal is output from an image output device such as a laser printer.

In conjunction with such an image processor, there has heretofore been disclosed a method wherein a portion of the image of the original is processed differently from other portions of the image (see Japanese Laid Open Patents, Gazette Nos. 60-242480 and 60-213168). Application of such an image processor to a copying machine makes it possible to perform operations such as deletion, extraction, color conversion, and the application of a background halftone screen to an image within a designated region.

In such a copying machine, it is necessary to designate a region to be edited. For that purpose, it is usual to designate a closed region by inputting the coordinates of the region of interest in the original by means of the numerical keys or a digitizer. Designation of a closed rectangular region is achieved, for example, by identifying the coordinates of two verticles on its diagonal. Designation of a polygonal or an arbitrarily shaped region is achieved by identifying a multiplicity of points one after another, or by some other suitable manner.

A designated region is stored in a storage device such as a bit map memory, and image processing is carried out at the time of the copying operation for the designated region only, by reading the contents of the storage device and, at the same time, reading the original image.

Problem the Invention is Intended to Solve

With such a copying machine, editing operations such as deletion, extraction, color conversion, use of background halftone screen, and so forth, can be applied to designated regions. However, the storage device only stores information about the designated region. Therefore, information about the processing operation has to be stored separately. Accordingly, in the past, it has only been possible to designate one type of processing for an original sheet.

In order to accommodate a plurality of processing or editing operations for an original sheet, it is conceivable to make use of a storage device that has a number of storage locations corresponding to the number of processing operations and that allows storage of a region for every type of processing. In such a case, however, a storage device with a larger capacity is required and, as the number of processing operations becomes large, the device becomes more costly.

Objects of the present invention are to resolve the abovementioned problem and make it possible to set a plurality of processing operations for an original sheet without significantly increasing the capacity of the storage device.

SUMMARY OF THE INVENTION

In order to achieve the above and other objects, the present invention comprises input means for inputting coordinates designating a region of the original image and for designating a processing operation, storage means, having groups of corresponding storage locations, wherein each group of corresponding storage locations corresponds to a portion of the original image, means for setting a subset of the groups of storage locations corresponding to said designated region to a predetermined state to store the designated processing operation, image input means for reading the original image, means for reading the contents of the set of corresponding storage locations of the storage means when the original is read, and image processing means for carrying out the designated processing operation for the image in the designated region based on the contents of the storage locations.

Additional objects and advantages of the invention will be set forth in part in the description which follows and, in part, will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate one embodiment of the invention and, together with the description, serve to explain the principles of the invention.

DESCRIPTION OF A PREFERRED EMBODIMENT

Reference will now be made in detail to a present preferred embodiment of the invention, an example of which is illustrated in the accompanying drawings. Wherever possible, the same reference numbers will be used throughout the drawings to refer to the same or like parts.

An editing region designated by coordinate input means such as a digitizer 13 is stored in storage means such as a bit map memory 9a-9c. In the present invention, the storage means has a capacity sufficient to store information about a plurality of designated regions of the original, and each designated region is stored in a predetermined location of the storage means in accordance with the processing operation to be performed on that designated region. In this case, the processing operation and the memory location of the storage means do not correspond with each other in a one-to-one fashion. Rather, the processing operation is represented by a combination of memory locations. If, for example, the storage means contains three bit maps, then it is possible to designate up to eight processing operations. At the time of image output, the contents of the storage means are read out at the same time as the original is read. Since the contents of the storage means includes information concerning the region as well as information concerning the processing operation, by processing an image of the original based on the information it becomes possible to carry out a different processing operation for each of a plurality of regions designated in an original sheet.

Figure 1:
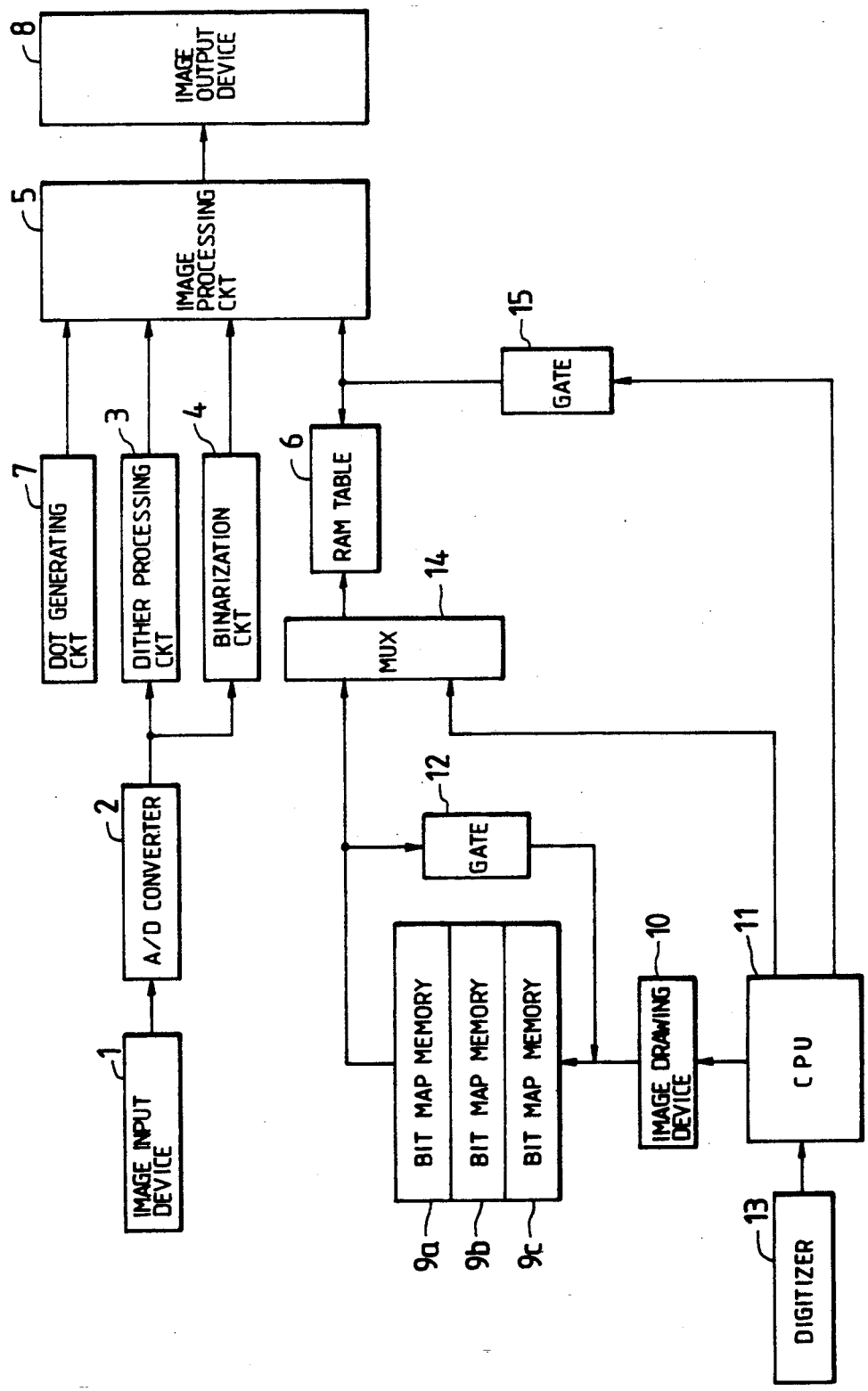
FIG. 1 is a block diagram showing a preferred embodiment of an image processor of the present invention.
Figure 2:
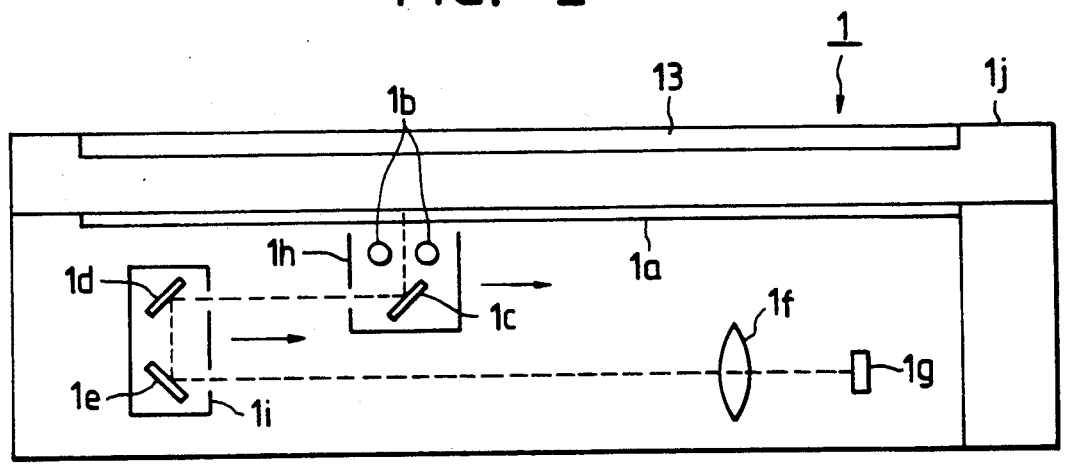
FIG. 2 is a schematic sectional view showing an image input device and a digitizer.

FIG. 1 shows a block diagram of an embodiment of an image processor of the present invention. In the FIGURE, numeral 1 refers to an image input device for reading an image of an original. As shown in FIG. 2, the image input device 1 illuminates an original (not shown) placed on a platen glass 1a with a light source 1b, causing the light reflected from the original to be reflected in turn by mirrors 1c, 1d, and 1e to form an image on an image sensor 1g by means of a lens 1f, thereby obtaining an image signal from the image sensor 1g. The light source 1b and the mirror 1c are attached to a full-speed carriage 1h, and the mirrors 1d and 1e are attached to a half-speed carriage 1i. The image of the original is read by moving the full-speed carriage 1h in the direction of the arrows in FIG. 2, along a bottom surface of the platen glass 1a, and also by moving the half-speed carriage 1i in the same direction with a speed one-half that of the full-speed carriage 1h.

An image signal from the image input device 1 is converted to a digital signal by an A/D converter 2, and is supplied to an image processing circuit 5 via a dither processing circuit 3 (in the case of a half-tone image such as a photograph original) or via a binarization circuit 4 (in the case of a binary image such as a character original). The image processing circuit 5 is connected to a random access memory (RAM) table 6 in which are stored predetermined function codes for processing operations such as deletion, extraction, color conversion, and the use of background half-tone screen. Each of the above processing operations is carried out in accordance with that function code read out of the RAM table 6. In the figure, a dot generating circuit 7 generates a meshlike pattern of dots when a background halftone screen is used. An image signal is supplied from the image processing circuit 5 to an image output device 8, such as a laser printer, to be output as an image. In other words, the image of the original can be copied and at the same time have certain editing processing applied thereto.

In FIG. 1, bit map memories 9a, 9b, and 9c store the regions to be edited and the processing operation for each region. It should be noted that each of bit map memories 9a, 9b, and 9c is large enough to store the entire image of the original read by the image input device 1. The bit map memories 9a, 9b, and 9c are connected to an image drawing device 10. The image drawing device 10 allows speedy writing to and reading from the bit map memories 9a, 9b, and 9c. For that purpose, the image drawing device 10 is preferably a CRTC (cathode-ray tube controller), such as HD63484, a special purpose integrated circuit for image drawing manufactured by Hitachi Corp. The image drawing device 10 is connected to a CPU (central processing unit) 11.

Further, a gate 12 is connected between the output side of the bit map memories 9a, 9b, and 9c and the image drawing device 10. The gate 12 is kept open when the image drawing device 10 is in input mode so that the image drawing device 10 is able to refer to the contents of the bit map memories 9a, 9b, and 9c.

The CPU 11 writes a function code to the RAM table 6, controls the image drawing device 10, and so forth. The CPU 11 also writes the contents of the RAM table 6 based on a signal from the digitizer 13 designating the region of the original to be edited and the processing operations to be performed, and sends an indication to the image drawing device 10 as to which region of the bit map memories 9a, 9b, and 9c is to be filled.

Multiplexer (MUX) 14 selects either the three bit signal from the bit map memories 9a, 9b, and 9c or the output of CPU 11 to be supplied to the RAM table 6. The output of the RA table 6 is supplied to the image processing circuit 5 as a function code indicating a processing operation. Further, between the RAM table 6 and the CPU 11 there is provided a gate 15 that is kept open, except for the period of reading the image of the original, to permit direct rewriting of the contents of the RAM table 6 by the CPU 11.

Figure 3:
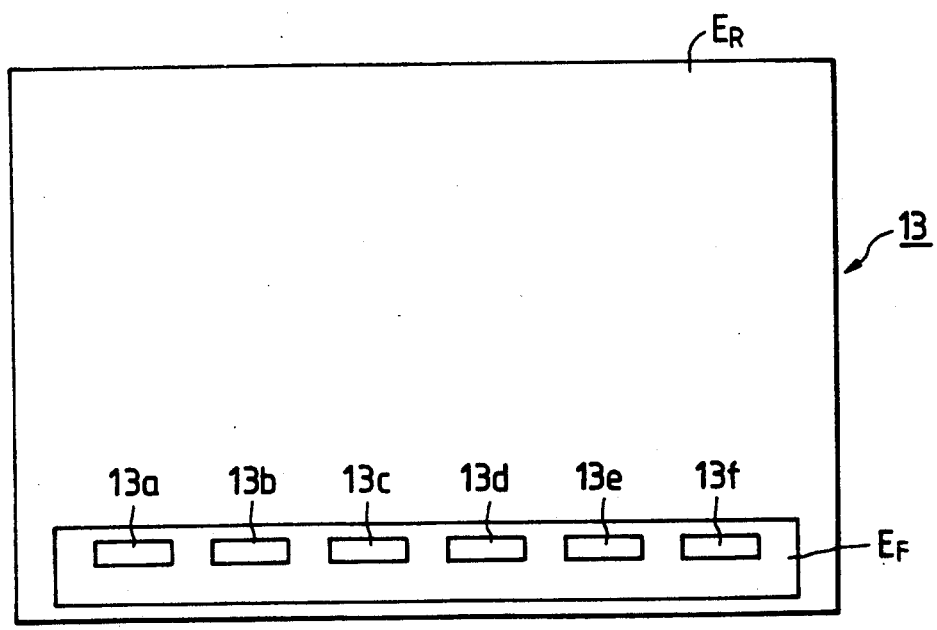
FIG. 3 is a schematic plan view of the digitizer of FIGS. 1 and 2.

As shown in FIG. 3, the digitizer 13 has a plane area approximately the size of A3 paper for obtaining the coordinate of a point depressed by a pen or the like. The digitizer 13 includes region designating area $E_R$ for designating the region to be edited and function designating area $E_F$ for designating a processing operation to be performed. In the function designating area $E_F$, there are a plurality of windows 13a–13f corresponding to the various possible processing operations. Thus, the CPU 11 interprets the coordinate data as information concerning the region when the region designating area $E_R$ is depressed, whereas the CPU 11 interprets the coordinate data as information concerning the processing operation to be performed when any of the windows 13a–13f of the function designating area $E_F$ is depressed.

As shown in FIG. 2, the digitizer 13 preferably is located on the top face of a platen cover 1j, which covers the platen glass 1a so as to permit the free opening and closing of the platen cover 1j.

Figure 4A:
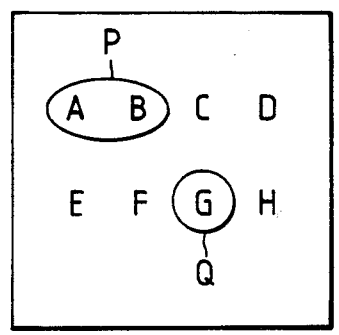
FIGS. 4(a) and 4(b) are explanatory diagrams showing the relationship between an image of an original and an image after image processing.
Figure 4B:
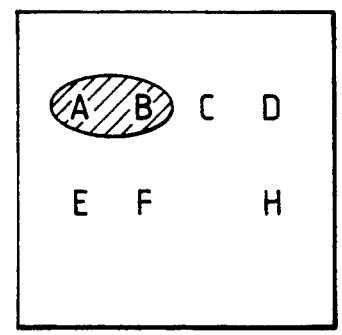

Next, the action of the image processing circuit 5 will be illustrated for an example of carrying out an image editing wherein a portion of the image in a first region P of an original in FIG. 4 is to be given a halftone screening and a portion of the image in a second region Q is to be deleted therefrom.

First, an original is placed on the digitizer 13 and the outer periphery of the region to be given a halftone screening is indicated by a pen. In the example of FIG. 4, characters "A" and "B" are encircled. In this case, the digitizer 13 is operated in a continuous input mode wherein the coordinated area is read continuously as long as the tip of the pen keeps contact with the coordinate input face of the digitizer 13. The coordinate data for the outline of the editing region indicated in this fashion is stored in a register (not shown) within the CPU 11.

Next, by depressing one of the windows 13a–13f corresponding to the halftone screening function the processing operation is similarly stored in the register (not shown) within the CPU 11.

Next, the periphery of the region to be deleted is indicated similarly with a pen. In the example of FIG. 4, the character "G" is encircled and the "deletion" function is indicated on area $E_F$. Information concerning the region and the processing operation to be performed are stored in the register (not shown) within the CPU 11.

It should be noted that, in the above example, although an arbitrary region is designated by continuously encircling the region for editing, a rectangle defined by two of its vertices can also designate a region for editing, as mentioned earlier.

Next, the image is read by placing the original on the platen glass 1a of the image input device 1. In the present embodiment, prior to the actual reading of the image from image input device 1, the outer peripheral pattern, namely, the outline, of each of the designated regions is stored in a location that corresponds to a processing function code contained in the bit map memories 9a, 9b, and 9c. Then, the interior of the outline is filled. In other words, the address bit corresponding to the interior of the designated region of the bit map memories 9a, 9b, and 9c is set to a predetermined value, for example "1." Image drawing of this kind can be executed at high speed by the image drawing device 10 in accordance with a known algorithm and as indicated by a signal from the CPU 11.

In the present embodiment, combinations of the locations of the bit map memories 9a, 9b, and 9c, to which regions are written corresponding to the type of processing, are varied.

In the present embodiment, use is made of three bit map memories 9a, 9b, and 9c. Thus, it is possible to select $2^3$ different processing operations, as shown in Table 1. That is, it is possible to designate eight different processing operations or kinds of editing, including the operation of "no processing." In a table, "1" means fill and "0" means do not fill the area.

TABLE 1

| Function Number | Bit Map Memory | | | Processing Operation |
|---|---|---|---|---|
| | 9a | 9b | 9c | |
| 0 | 0 | 0 | 0 | No processing |
| 1 | 0 | 0 | 1 | Deletion |
| 2 | 0 | 1 | 0 | Extraction |
| 3 | 0 | 1 | 1 | Color conversion |
| 4 | 1 | 0 | 0 | |
| 5 | 1 | 0 | 1 | Use of background halftone screen |
| 6 | 1 | 1 | 0 | |
| 7 | 1 | 1 | 1 | |

Next, the RAM table 6 is set. That is, the correspondence between each function number and the actual processing operation is established as shown in Table 1. It should be mentioned that the RAM table 6 may be set prior to the designation of the bit map memories 9a, 9b, and 9c.

Figure 5A:
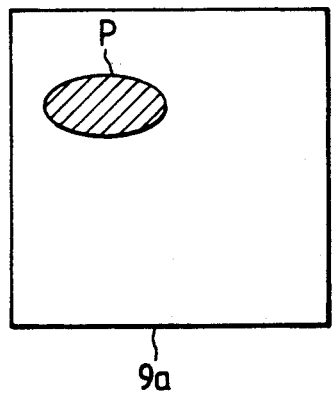
FIGS. 5(a), 5(b) and 5(c) are explanatory diagram schematically showing the bit patterns stored within each of a plurality bit map memories of FIG. 1
Figure 5B:
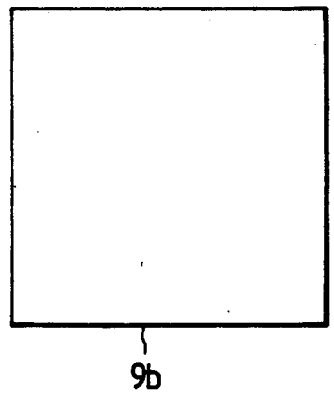
Figure 5C:
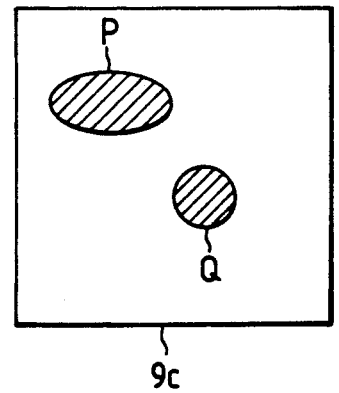

When the processing operation for the first region P is the halftone dot meshing in the background and the processing operation for the second region Q is deletion, as in the above example, the bit map memories 9a and 9c are filled for the first region P, and the bit map memory 9c is filled while the bit map memories 9a and 9b are not filled for the second region Q, as shown in FIGS. 5(a)-5(c).

Here, the correspondence between the function numbers and the processing operations is not fixed, and combinations different from those shown in Table 1 can also be established by the signal from the CPU 11. For example, if the function codes that represent the processing operations are represented by 8 bits in the RAM table 6, then it becomes possible to set 256 different processing operations, and any arbitrary seven processing operations can be designated simultaneously (in addition to "no processing") by rewriting the RAM table 6.

When the filling of the regions in bit map memories 9a-9c as described above is completed, the actual copying operation is started and the image is read by moving the scanning optical system, which is provided within the image input device 1. A signal obtained from the image input device 1 at the time of image reading is supplied to the image processing circuit 5 via the A/D converter 2, and either of the dither circuit 3 or the binarization circuit 4.

At the same time as the image is read, the bit map memories 9a, 9b, and 9c are read out, and used to address the RAM table 6.

In the image processing circuit 5, processing operations corresponding to the function codes from the RAM table 6 are executed. Namely, halftone dot meshing is applied to the image signal for the portion of the first region P from the dither processing circuit 3 or the binarization circuit 4 and by the use of halftone screening signals from the dot generating circuit 7, and the deletion operation is applied to the image for the portion of the second region Q.

Then, the image signal is supplied to the image output device 8 and an image is output therefrom in which a halftone screening is applied to the image in the first region P and the image in the second region Q is deleted.

It is to be noted that a special-purpose integrated circuit is used as the image drawing device 10 in the described embodiment of the present invention. However, other embodiments of the invention need not be limited to this implementation alone, and may for example, carry out writing and reading for the bit map memories 9a, 9b, and 9c by adopting a CPU 11 that can operate at high speed.

What is claimed is:

1. An image processor for editing an original image to produce an edited output image, comprising:

input means for inputting sets of coordinates, each of said sets of coordinates designating a corresponding portion of a plurality of portions of the original image, said input means for designating at least one of a plurality of processing operations to be performed on the portion of the original image corresponding to each of said sets of coordinates to produce a corresponding edited image;

storage means including a plurality of storage locations, each of said plurality of storage locations having a plurality of subsets of storage location, each said subsets corresponding to each portion of said plurality of portions of the original image;

means responsive to said input means for setting a portion of each of said subsets of said plurality of storage locations to selected values according to predetermined combinations of said plurality of storage locations to store data representing said processing operation to be performed on each said portion of said original image, each said portion of said subsets of said plurality of storage locations indicating an interior of the corresponding portions of said original image;

image input means for scanning the original image to produce original image data;

means for accessing said data stored in said subsets of storage locations responsive to said scanning of said original image; and image processing means for receiving said accessed data and said original image data and for performing said processing operations in the designated portions of said image based on said accessed data to produce output image data representing the edited output image.

2. The image processor of claim 1, wherein said image processing means includes a plurality of processing operations;

wherein said means for accessing includes a second storage means for storing function codes corresponding to said plurality of processing operations; and wherein said data representing said processing operation is a memory address of a one of said stored function codes.

3. The image processor of claim 2, wherein said second storage means includes a RAM table.

4. The image processor of claim 2, wherein said second storage means contains eight-bit bytes, each byte storing one of 256 function codes.

5. The image processor of claim 1, wherein said input means includes a touch-sensitive digitizer having a first area and a second area for designating the processing operations.

6. The image processor of claim 1, wherein said means responsive to said input means includes an image drawing device controlled by a central processing unit.

7. The image processor of claim 1, wherein said means for accessing includes a multiplexer controlled by a central processing unit.

8. The image processor of claim 1, wherein said image processing means includes an image processing circuit.

9. An image processor for editing an original image to produce an edited output image, comprising:

input means for inputting sets of coordinates, each of said sets of coordinates designating a corresponding portion of a plurality of portions of the original image, said input means for designating at least one of a plurality of processing operation to be performed on the portion of the original image corresponding to each of said sets of coordinates to produce a corresponding edited image;

storage means including a plurality of storage locations, each of said plurality of storage locations having a plurality of subsets of storage locations, and said storage means includes a plurality of bit map memories, each bit map memory including at least one subset of the storage locations;

means responsive to said input means for setting a portion of each of said subsets of said plurality of storage locations to selected values according to predetermined combinations of said plurality of storage locations to store data representing said processing operation to be performed on each said portion of said original image;

image input means for scanning the original image to produce original image data;

means for accessing said data stored in said subsets of storage locations responsive to said scanning of said original image; and image processing means for receiving said accessed data and said original image data and for performing said processing operations in the designated portions of said image based on said accessed data to produce output image data representing the edited output image.

10. An image processor for editing an original image to produce an edited output image, comprising:

input means for inputting sets of coordinates, each of said sets of coordinates designating a corresponding a portion of a plurality of portions of the original image, said input means for designating at least one of a plurality of processing operation to be performed on the portion of the original image corresponding to each of said sets of coordinates to produce a corresponding edited image;

storage means including a plurality of storage locations having three bit map memories, each of said plurality of storage locations having a plurality of subsets of storage locations;

means responsive to said input means for setting a portion of each of said subsets of said plurality of storage locations to selected values according to predetermined combinations of said plurality of storage locations to store data representing said processing operation to be performed on each said portion of said original image;

image input means for scanning the original image to produce original image data;

means for accessing said data stored in said subsets of storage locations responsive to said scanning of said original image; and image processing means for receiving said accessed data and said original image data and for performing said processing operations in the designated portions of said image based on said accessed data to produce output image data representing the edited output image.

* * * * *

UNITED STATES PATENT AND TRADEMARK OFFICE
CERTIFICATE OF CORRECTION

PATENT NO. : 5,191,443
DATED : March 02, 1993
INVENTOR(S) : Daiji Nagaoka

It is certified that error appears in the above-indentified patent and that said Letters Patent is hereby corrected as shown below:

Claim 1, column 6, line 53, change "location" to --locations--.

Claim 1, column 6, line 54, after "each" (first occurrence) insert --of--.

Claim 5, column 7, line 28, after "area" (first occurrence), insert --for designating the portions of the original image--.

Claim 9, column 7, line 45, change "operation" to --operations--.

UNITED STATES PATENT AND TRADEMARK OFFICE
CERTIFICATE OF CORRECTION

PATENT NO. : 5,191,443
DATED : March 2, 1993
INVENTOR(S) : Daiji Nagaoka

It is certified that error appears in the above-indentified patent and that said Letters Patent is hereby corrected as shown below:

Claim 10, column 8, line 27, change "operation" to --operations--.

Signed and Sealed this

Eighth Day of February, 1994

Attest:

BRUCE LEHMAN

Attesting Officer

Commissioner of Patents and Trademarks